United States Patent [19]

Yamamoto et al.

[11] E Re. 29,796

[45] Reissued Oct. 10, 1978

[54] AUTOMATIC CREDIT LOAN MACHINE

[75] Inventors: Mititaka Yamamoto; Yukio Mizuta; Toshio Tanaka; Takeo Asada, all of Kyoto, Japan

[73] Assignee: Omron Tateisi Electronics Co., Kyoto, Japan

[21] Appl. No.: 141,856

[22] Filed: May 10, 1971

Related U.S. Patent Documents

Reissue of:

[64] Patent No.: 3,443,675
Issued: May 13, 1969
Appl. No.: 649,666
Filed: Jun. 28, 1967

[30] Foreign Application Priority Data

Jul. 1, 1966 [JP] Japan ..... 41-42799

[51] Int. Cl.[2] ..... G07F 7/08
[52] U.S. Cl. ..... 194/4 C
[58] Field of Search ..... 194/4, 4 C, 10

[56] References Cited

U.S. PATENT DOCUMENTS

| | | | |
|---|---|---|---|
| 3,039,582 | 6/1962 | Simjian | 194/4 |
| 3,516,527 | 6/1970 | Radford et al. | 194/4 |

*Primary Examiner*—Stanley H. Tollberg
*Attorney, Agent, or Firm*—Christensen, O'Connor, Johnson & Kindness

[57] ABSTRACT

This invention provides an automatic credit loan machine operable in response to a credit card introduced thereinto to dispense a predetermined loan of cash, which comprises: means for testing the genuineness of a credit card introduced; means operable in response to the testing means for reading the identification number of the credit card and testing its validity; means for recording the identification number when it is valid; means for storing genuine cards that have been introduced into the machine so as not to be returned; and means for dispensing a predetermined loan of cash when the identification number of the credit card introduced is valid.

12 Claims, 8 Drawing Figures

Fig. 1.
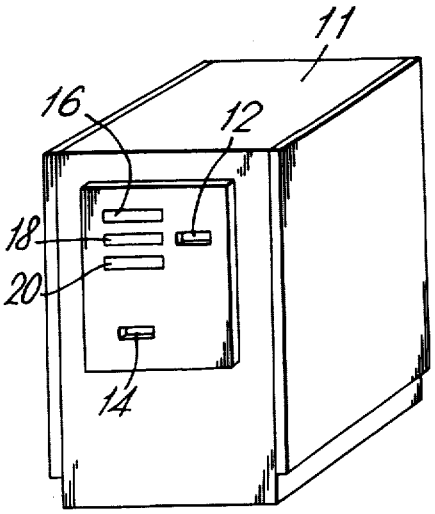
Fig. 2.
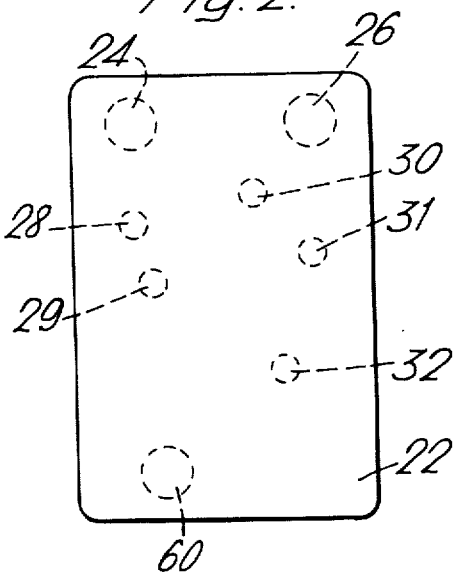
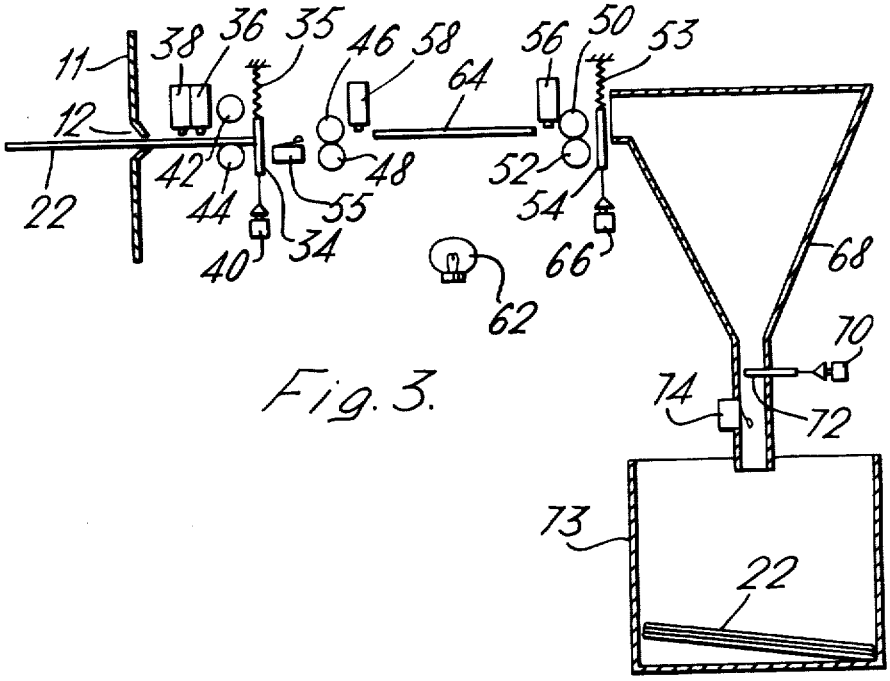
Fig. 3.
MITITAKA YAMAMOTO
YUKIO MIZUTA
TOSHIO TANAKA
TAKEO ASADA
INVENTORS
BY
Christensen, Sanborn, & Matthews
ATTORNEYS

INVENTORS
MITITAKA YAMAMOTO
YUKIO MIZUTA
BY TOSHIO TANAKA
TAKEO ASADA
ATTORNEYS

MITITAKA YAMAMOTO
YUKIO MIZUTA
TOSHIO TANAKA
TAKEO ASADA
INVENTORS
BY
Christensen, Sanborn & Matthews
ATTORNEYS MITITAKA YAMAMOTO
YUKIO MIZUTA
TOSHIO TANAKA INVENTORS
TAKEO ASADA
BY Christensen, Sokoloff & Kitchen
ATTORNEYS

MITITAKA YAMAMOTO
YUKIO MIZUTA
TOSHIO TANAKA
TAKEO ASADA INVENTORS

BY Christensen, Sanborn & Matthews
ATTORNEYS

MITITAKA YAMAMOTO
YUKIO MIZUTA
TOSHIO TANAKA
TAKEO ASADA
INVENTORS
BY Christensen, Sandoe & Matthews
ATTORNEYS

AUTOMATIC CREDIT LOAN MACHINE

Matter enclosed in heavy brackets [ ] appears in the original patent but forms no part of this reissue specification; matter printed in italics indicates the additions made by reissue.

In the daytime, cash may be borrowed from banks and other credit sources. At night or on holidays, however, such credit sources are not available. There are known many credit card types of automatic vending machines. In such vending machines, it may indeed be possible to substitute cash for the articles to be sold. With the prior art systems, however, one could obtain as much loan as one desired with a single credit card. This would result in an increase in the percentage of doubtfull or bad debts.

Accordingly, it is the primary object of the invention to provide an automatic credit loan machine from which only a predetermined loan of cash can be obtained with a single credit card, which card, once used, is not returned to the debtor again. In accordance with the invention, the credit card that has been used in the machine is not returned to the debtor but enclosed in the machine. Therefore, bankers can give customers as many credit cards as their respective credits guarantee, thereby greatly reducing the percentage of bad debts.

The machine of the invention is most likely to be installed outdoors. Some may do mischief to the machine and others may profiteer with it by pulling out the card once introduced after a loan of cash has been obtained. Various measures against such actions have been taken in the machine of the invention.

The invention will be explained in detail with reference to the accompanying drawings, wherein:

FIG. 1 is a perspective view of the housing of the machine;

FIG. 2 is a front view of a credit card used in the machine;

FIG. 3 is a schematic side view showing the arrangement of the various component parts of the machine;

Figure 4:
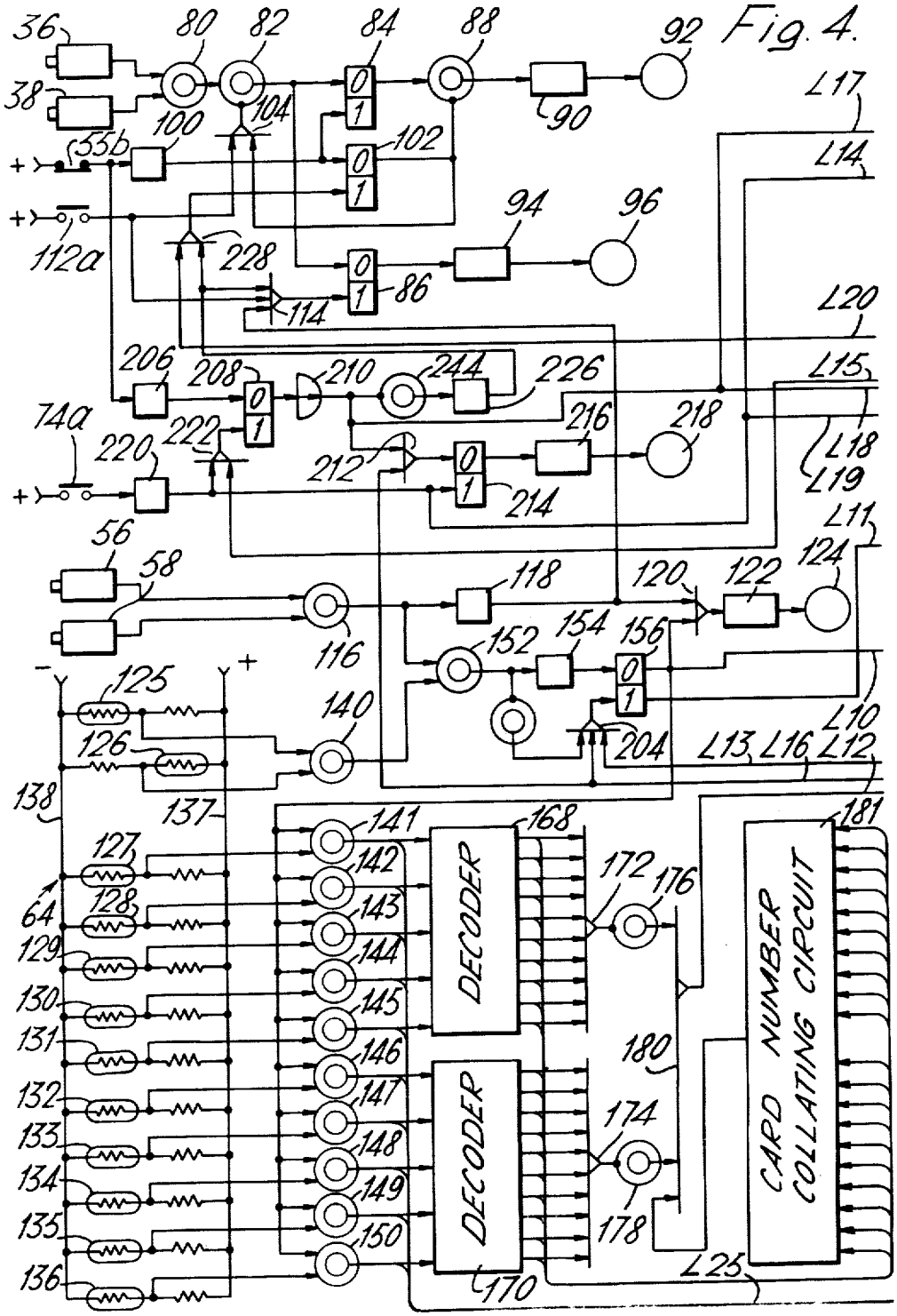
FIGS. 4 to 6 are combined to show an electrical circuit diagram, partly in block, for controlling the mechanism of the invention.

Referring now in detail to the drawings, there is shown a housing 11 enclosing the various mechanical and electronic components of the apparatus of the invention. The housing is provided on the front panel thereof with a slot 12 for a credit card to be introduced through; a slot 14 through which the cash is dispensed; a window 16 in which appears an indication whether the machine is "in operation" or "not operating"; a window 18 in which appears an indication that "the card inserted is invalid and will not be returned"; and a window 20 in which when the card is valid and proper, a sign "Thank you" or "Just a moment" appears until the cash is sent out.

Any person who wishes a loan of cash money from the machine is supposed to insert into the slot 12 a credit card 22 with it predetermined edge forward. The card 22 has an invisible element by which to recognize its genuineness. Such an element is shown in FIG. 2 as disc

24 consisting of non-magnetic material and a disc 26 of magnetic material, both embedded inside the card so as to be invisible. The card is also provided with defined portions or areas such as holes through which light can transmit. In practice, the card may be made of opaque vinyl chloride sheet, with holes formed at predetermined positions, and covered on both sides with a transparent sheet of the same material. The positions of the holes represent a coded card number, which can be read by a card reader in the machine, as will be described in detail later.

When the card 22 is inserted into the slot 12, it hits on a stopper 34 as shown in FIG. 3, whereupon the elements 24 and 26 on the cards are positioned just below a pair of genuineness testers 36 and 38, respectively. The testers are proximity detectors responsive to only non-magnetic and magnetic materials, respectively. When the inserted card is genuine and placed at a predetermined proper position, the detectors 36 and 38 sensing the elements 24 and 26, respectively, produce an output at the same time, whereupon a solenoid 40 is energized to pull down the stopper 34 against the resiliency of a spring 35 so that the card is ready to be further pulled in. At the same time a roller 42 is pulled down by the stopper 34 to press the forward end of the card against a bottom roller 44, whereupon the roller 44 rotates to draw in the card. Two pairs of rollers 46, 48 and 50, 52 are provided ahead of the rollers 42 and 44 and the rollers 48 and 52 are rotated simultaneously with the roller 44, so that the card is drawn in as far as it hits on a second stopper 54.

Before arriving at this position, the card actuates a switch 55, which after passage of the card, is restored, whereupon the solenoid 40 is deenergized to let the stopper 34 and the roller 42 to be pulled upward by the spring 35, thereby preventing the card, once inserted, from being pulled outside again. When the card hits on the second stopper 54, the card has its forward end sandwiched by the rollers 50 and 52 and its rear end, by the rollers 46 and 48. The card has a third element 60 of magnetic (or non-magnetic) material at the rear end thereof, and when the card is at the position mentioned just above where it is stopped by the second stopper, the elements 24 and 60 face another pair of proximity detectors 56 and 58, respectively, for a second genuineness test. When the card is again recognized genuine, both detectors 58 and 56 produce an output signal at the same time, which causes the rollers 44, 48 and 52 to be stopped and at the same time a lamp 62 to project light onto the card. Above the card there is disposed a photosensitive device 64 including a plurality of photoconductive elements arranged at those positions corresponding to those of the holes necessary to express the coded numbers of all the cards that have been issued. When the card 22 faces the device 64, only those photoconductive elements which face the holes 28 - 32 are activated, so that the card number can be read. If the card number is a valid number registered beforehand, a recorder records the number and at the same time, the previously mentioned indication appears in the window 20 on the front panel of the machine, and a solenoid 66 is energized to pull the stopper 54 down against the resiliency of the spring 53, and the rollers 48 and 52 are again rotated to further advance the card. Simultaneously with the energization of the solenoid 66, a solenoid 70 is energized to pull a stopper 72 out of the neck of a hopper 68, so that the card drops into a receptacle 73. As the card drops through the hopper neck, a switch 74 is actuated and then restored, whereupon the rollers 48 and 52 are stopped and the solenoids 66 and 70, deenergized. This prevents the card, once received into the receptacle 73, from being pulled out.

Figure 6:
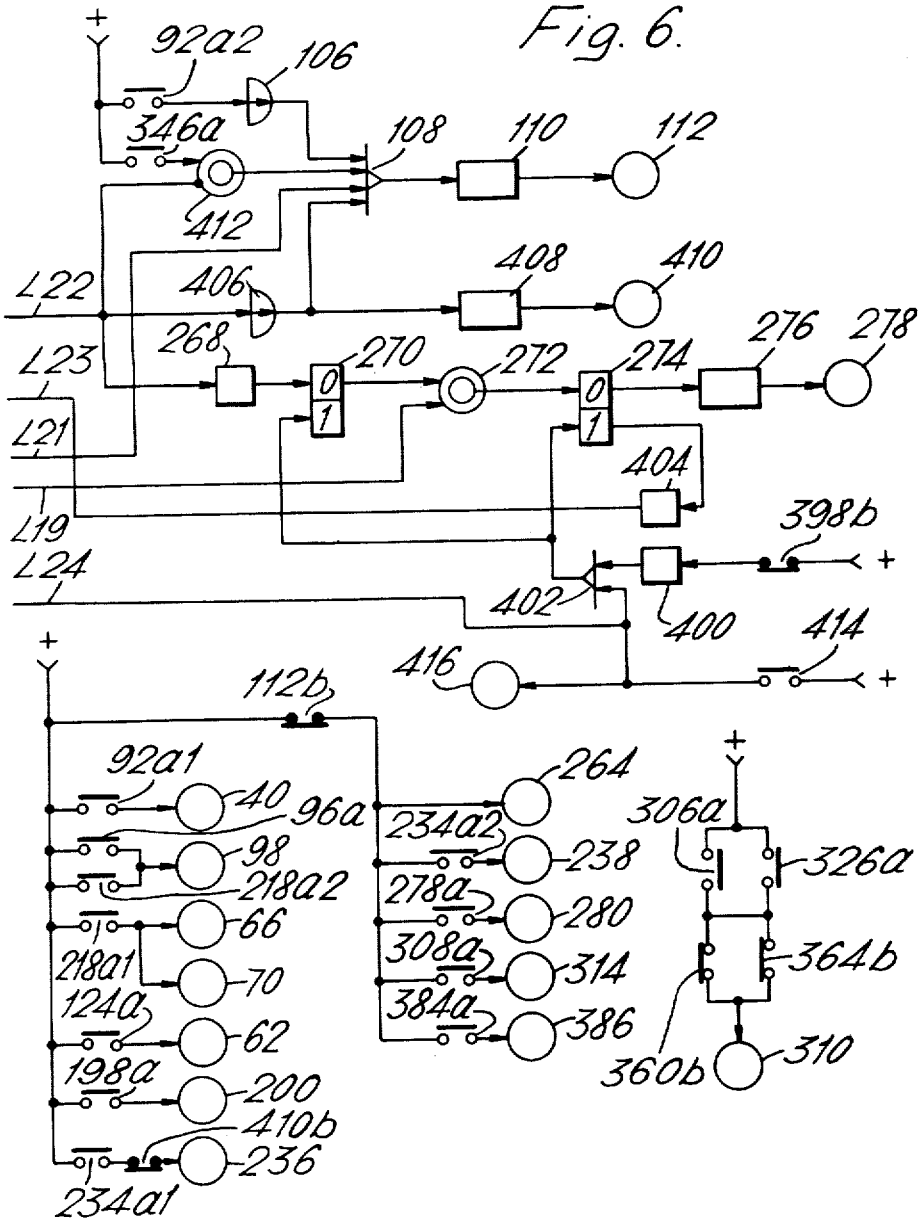
Figure 7:
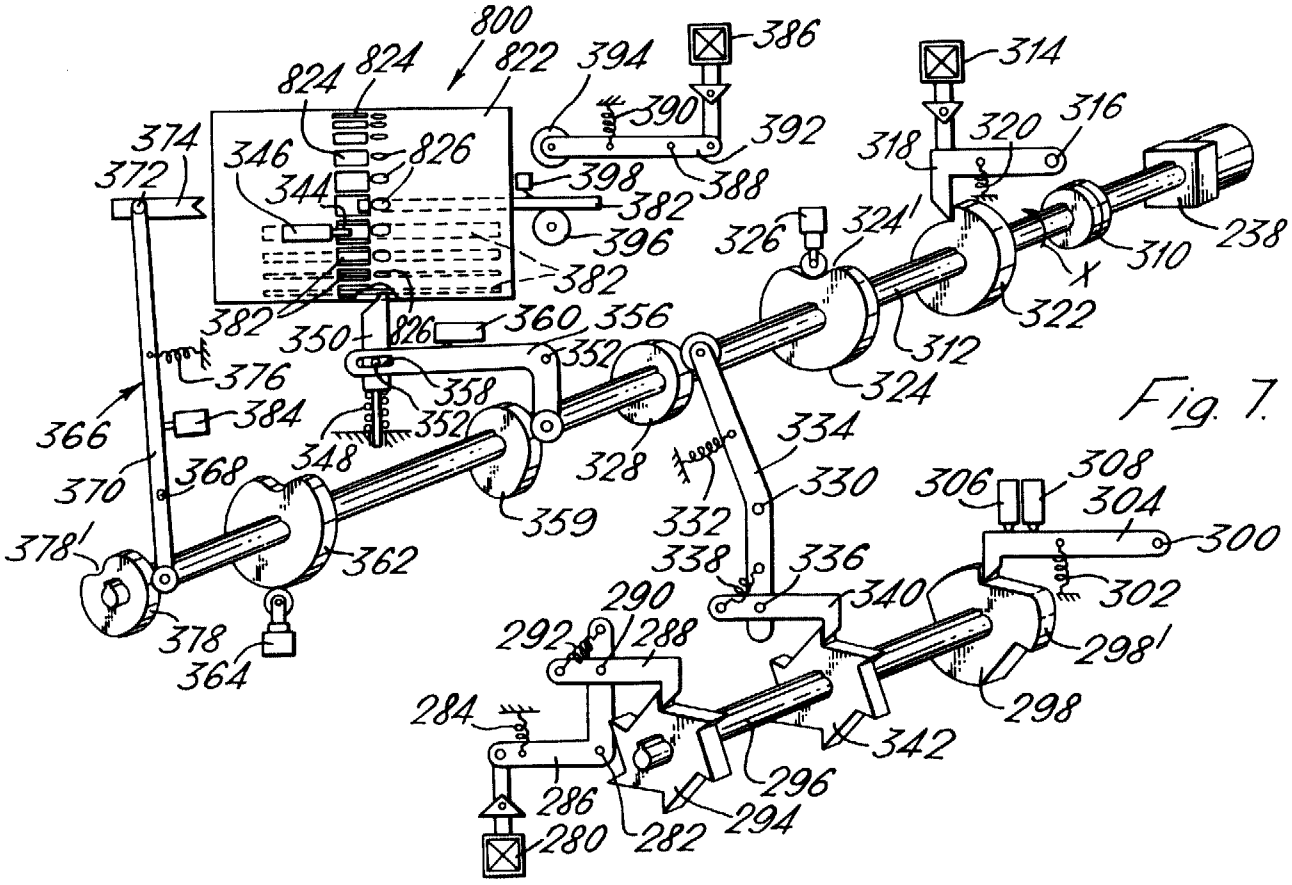
FIG. 7 is a schematic perspective view of the cash dispensing mechanism.

With the card number having been recognized as valid, upon restoration of the switch 74, a mechanism shown in FIG. 7 is operated to dispense a loan of cash out of the slot 14. If the card number is invalid, the indication to that effect appears in the window 18 and the invalid card is also received into the receptacle 73, just as in the case with valid cards, so that the card cannot be used again fraudulently or otherwise. No cash, of course, is dispensed in this case. The above sequence of operation is accomplished by the control circuits shown in FIGS. 4–6.

When a card has been inserted through the slot 12 as far as its forward edge hits on the stopper 34, the detectors 36 and 38 sense the elements 24 and 26 in the card and produce an output. When both the outputs of the detectors are simultaneously applied to an AND element 80 (FIG. 4), this AND element produce an output, which is applied to the input of an INHIBIT element 82. With no inhibit signal being applied to the INHIBIT element at this time, the element 82 produces an output to be applied as a set input signal to flip-flops 84 and 86, whereupon they produce a set output. The set output of the flip-flop 84 is applied to the input of an INHIBIT element 88, and with no inhibit signal applied thereto at this time, the INHIBIT element 88 produces an output, which is amplified by an amplifier 90 to energize a relay 92. On the other hand, the set output of the flip-flop 86 is amplified by an amplifier 94 to energize a relay 96. When energized, the relay 92 has its contact 92a1 (FIG. 6) closed to energize the solenoid 40 (FIG. 3), so that the stopper 34 together with the roller 42 is pulled down for the card to be ready to be further drawn in. The relay 96, when energized, has its contact 96a closed to energize a motor 98 to rotate the rollers 44, 48 and 52, so that the card is drawn in as far as it hits on the second stopper 54. During this course of movement, the switch 55 has its normally closed contact 55b (FIG. 4) once opened and then again closed, whereupon a voltage from a source is applied through a differentiator 100 to reset the flip-flop 84 on the one hand and set a flip-flop 102 to produce a set output, on the other. This set output is applied to as an inhibit signal to the INHIBIT element 88 and also through an OR element 104 to the INHIBIT element 82. This deenergizes the relay 92 and, consequently, the solenoid 40, so that the stopper 34 and the roller 42 are pulled upward by the spring 35. With the inhibit signal being applied to the INHIBIT element 82, even if another card is successively inserted through the slot 12, the system will not operate until the previously inserted card is finished.

When the relay 92 has been energized as previously mentioned, it has its other contact 92a2 (FIG. 6) closed so that an input is applied to a timer 106. If the switch 55 has not been restored before lapse of a time set in the timer 106, an output from the timer energizes a keep relay 112 through an OR element 108 and an amplifier 110. The keep relay 112, once energized, keeps its energized condition even when the energizing input is cut off. Upon energization of the relay 112, therefore, its contact 112a is closed, so that an input is applied to the OR element 104, the output of which is applied as an inhibit signal to the INHIBIT element 82 (FIG. 4). The signal through the closed relay contact 112a also resets the flip-flop 86 through an OR element 114, whereupon the relay 96 is deenergized to stop the motor 98. This prevents such profiteerings as pulling out the inserted card by means of a string attached thereto after cash has been obtained, or continuous rotation, due to mischieves of the motor and resulting wear of the rollers 42, 44, etc.

When the card has its forward end abutting on the stopper 54, the elements 24 and 60 on the card face the detectors 56 and 58, respectively. If the card is again recognized genuine, both detectors produce an output, which is applied to an AND element 116. The output of this AND element is differentiated by a differentiator 118 and then applied through the OR element 114 to the flip-flop 86 to reset the same, whereupon the relay 96 is deenergized to stop the motor 98 and consequently the card at that position. The output pulse from the differentiator 118 is applied through an OR element 120 to an amplifier 122, the amplified output of which energizes a relay 124 so that its contact 124a is closed to turn on the lamp 62.

The photosensitive device 64 comprises photoconductive elements 125 - 136, of which the elements 127 - 136 are arranged at those positions corresponding to those of the holes necessary to express the coded numbers of all the cards that have been issued, while the element 126 is positioned to face a hole, say, 32 shown in FIG. 2, formed at the same position in all the cards, and the elements 125 are positioned where no hole is formed in any of the cards. Each photoconductive element has its own series resistor, and all those series combinations are connected between source lines 137 and 138.

When no light impinges on the elements 127 - 136, they apply an input to one of the two input terminals of AND elements 141 - 150, respectively; when no light hits on the element 125, it applies an input to one of the two input terminals of an AND element 140; and when light impinges on the element 126, it applies an input to the other input terminal of the AND element 140. In this case, the junction between each photoconductive element and its series resistor is connected to the above-mentioned one input of the corresonding AND element. The photoconductive elements 125 and 126 are for the purpose of defining the proper position of the inserted card.

As previously mentioned, when the card introduced is genuine, an output is produced by the AND element 116. If the card is at a proper position, light is projected onto the photoconductive element 126, but not onto the element 125. As a result, the AND element 140 receives two inputs at the same time and produces an output. Thus, the two outputs of the AND elements 116 and 140 are applied to an AND element 152 to produce an output. The production of an output from the AND element 152 means that the card introduced is genuine and is now at the proper position. The output of the AND element 152 is applied through a differentiator 154 to set a flip-flop 156, the set output of which is applied through the OR element 120 to the relay 124 so as to maintain its operating condition which has been initiated by the pulse from the differentiator 118. In other words, the lamp 62 is kept illuminating.

Figure 5:
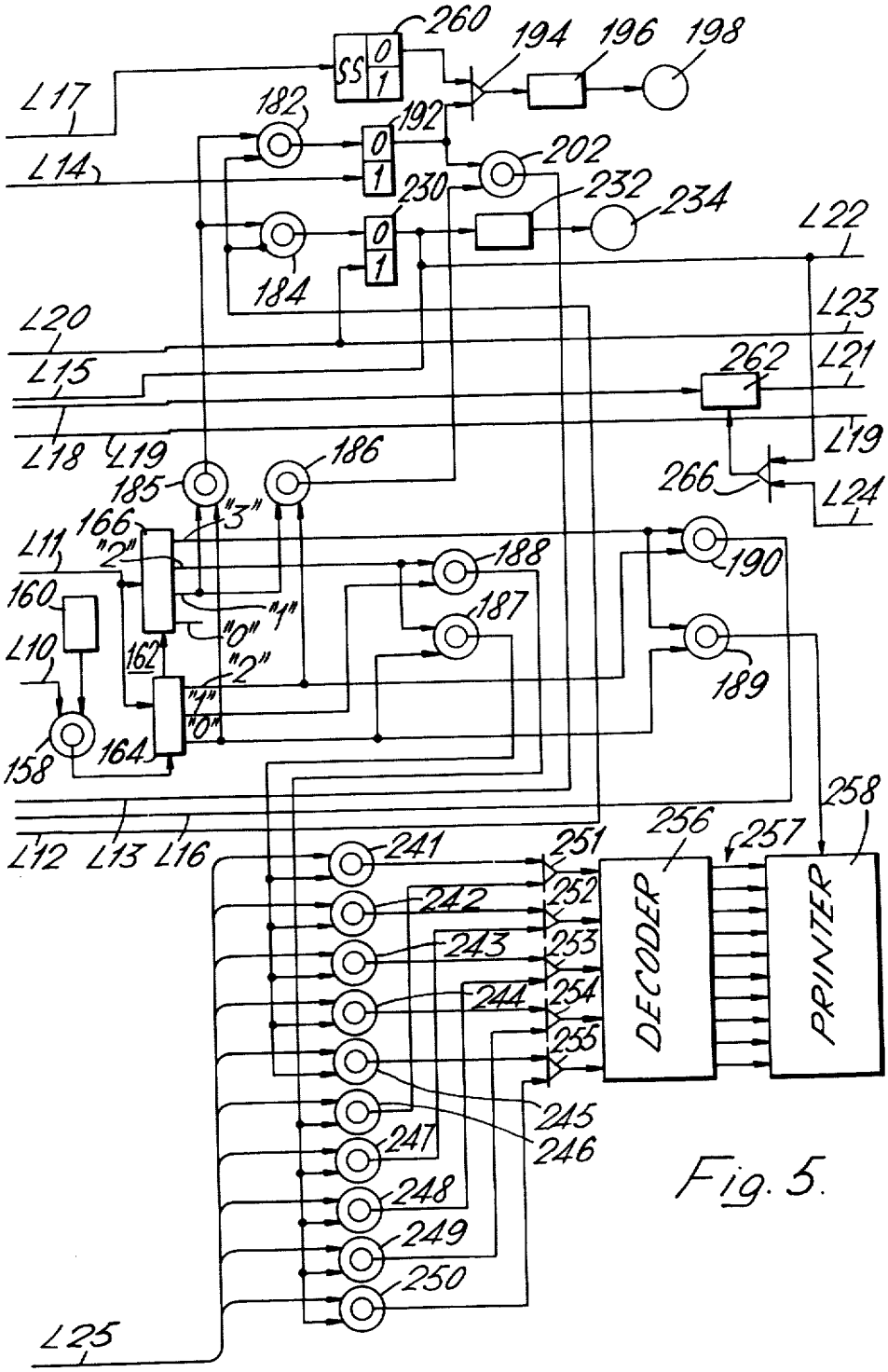

The set output of the flip-flop 156 is also applied to the other input of each of the AND elements 141 - 150, so that the AND elements, excepting those connected to the illuminated photoconductive elements, produce an output. The set output of the flip-flop 156 is also applied through a line L10 to one input of an AND element 158 (FIG. 5). A pulse generator 160 applies a series of pulses to the other input of the AND element 158. Therefore, when the AND element 158 receives the input through the line L10, it produces output pulses, which are counted by a pulse counter 162. The counter comprises a tertiary counter 164 and a quaternary counter 166, to which the reset output of the flip-flop 156 is applied through a line L11 as a reset signal. However, when the flip-flop 156 has been set by the differentiated pulse from the differentiator 154, there is no reset output from the flip-flop 156, so that the counters 164 and 166 start counting pulses from the AND element 158.

The photoconductive elements 127 - 136 are divided into two groups each including five elements, for example, 127 - 131 and 132 - 136. Two out of the five elements in the former group expresses a numeral in the second place of a card number, while two out of the five elements in the latter group express a numeral in the first place of the card number. In other words, each card has two holes formed at two out of five positions facing the five elements 127 - 131 in the first group so as to express a numeral in the second place of the card number, and two holes at two out of the five positions facing the five elements 132 - 136 in the second group so as to express a numeral in the first place of the card number. Accordingly, upon introduction of a card, three of the five AND elements 141 - 145 and also three out of the five AND elements 146 - 150 produce an output, while the other two elements in each group do not. The outputs of the AND elements 141 - 145 are applied to a decoder 168, while the outputs of the AND elements 146 - 150, to another decoder 170. The decoder 168 and 170 decimalize the coded number as expressed by the input signals and produce an output at one of the ten output terminals. The ten output terminals of the decoder 168 correspond to the ten decimal numerals 0 - 9 in the second place of a card number, while the ten output terminals of the other decoder 170, to the ten decimal numerals 0 - 9 in the first place of the card number. The outputs of the decoders 168 and 170 are applied through OR elements 172 and 174 to NOT elements 176 and 178, respectively, so that no output is produced by these NOT elements if the inputs to the decoders correspond to one of the above decimal numerals. Otherwise, the NOT elements produce an output, so that an OR element 180 produces an output.

The outputs of the decoders 168 and 170 are also applied to a collating circuit 181 in which the numbers of invalidated cards or missing cards are memorized beforehands. If the inputs to the circuit 181 express a card number which is memorized as invalid, the circuit 181 produces an output to be applied to the OR element 180. It is seen that the OR element 180 produces an output only when the card introduced is invalid. This output of the OR element 180 is applied through a line L12 to one of the two input terminals of an AND element 182 (FIG. 5) and also to the inhibit terminal of an INHIBIT element 184.

The pulse counter 164 (FIG. 5) has three output terminals 0 - 2, at which an output appears successively every time the counter counts one pulse. The pulse counter 166 has four output terminals 0 - 3, at which appears an output successively every time it counts one pulse. When three pulses have been counted by the counter 164, a carry pulse is applied to the counter 166. Accordingly, when the AND element 158 has applied three pulses to the counter 162, an AND element 185 produces an output; when five pulses have been counted, an AND element 186 produces an output; when six pulses have been counted, an AND element 187 produces an output; when seven pulses have been counted, an AND element 188 produces an output; when nine pulses have been counted, an AND element 189 produces an output; and when eleven pulses have been counter, an AND element 190 produces an output. It is seen that the first two pulses from the AND element 158 are intentionally wasted, in view of the speed of response of te photoconductive elements 125 - 136 and the time required for the operation of the decoders 168 and 170. When the third pulse from the AND element 158 has arrived, the elements and the decoders have been ready to operate.

As previously mentioned, when the card introduced is invalid, the OR element 180 produces an output. When the counter 162 has counted three pulses, the output produced by the AND element 185 is applied to one of the two input terminals of the AND element 182 and to the input terminal of the INHIBIT element 184. The output of the OR element 180 is applied to the other input terminal of the AND element 182, so that this AND element produces an output to be applied to a flip-flop 192 to set the same. The set output of the flip-flop 192 is applied through an OR element 194 and an amplifier 196 to a relay 198, whereupon its contact 198a (FIG. 6) is closed to light a lamp 200. This illuminates the indication in the window 18 that the card introduced is invalid and will not be returned.

When the counter 162 has counted five pulses, the AND element 186 produces an output to be applied to one input of an AND element 202 (FIG. 5). At this time, since the set output of the flip-flop 192 is applied to the other input of the AND element 202, it produces an output to be applied through a line L13 to an OR element 204 (FIG. 4), the output of which resets the flip-flop 156. This causes the relay 124 to be restored, thereby turning out the lamp 62 and at the same time removes one input to the AND elements 141 - 150 (FIG. 4) and 158 (FIG. 5), so that the outputs therefrom disappear. On the other hand, the reset output of the flip-flop 156 resets the pulse counters 164 and 166 through the line L11.

During this course of events, the opening and closing of the contact 55b of the switch 55 (FIGS. 2 and 4) causes a differentiator 206 to produce an output pulse to set a flip-flop 208, the set output of which is applied to a timer 210. When the time set in the timer 210 has elapsed after the lighting of the lamp 200, the output of the timer 210 is applied through an OR element 212 as a set input to a flip-flop 214. The set output of this flip-flop is amplified by an amplifier 216 to energize a relay 218, whereupon its contacts 218a1 and 218a2 are closed to energize the solenoids 66 and 70 and the motor 98, thereby pulling the stoppers 54 and 72 and rotating the rollers 48 and 52, so that the card drops through the hopper 68 into the receptacle 73. As the card drops, it actuates the switch 74 to close its contact 74a, whereupon a differentiator 220 (FIG. 4) produces an output pulse to be applied through an OR element 222 to the flip-flop 208 on the one hand and directly to a flip-flop 214 on the other, to reset both these flip-flops. The output of the differentiator 220 is also applied through a line L14 to the flip-flop 192 (FIG. 5) to reset the same. Upon the resetting of the flip-flop 208, the input to the timer 210 is removed, so that a NOT element 224 produces an output, which is differentiated by a differentiator 226. The differentiated output is then applied through an OR element 228 to reset the flip-flop 102, thereby restoring the original condition of the system.

When the card introduced is valid, no output is produced by the OR element 180, as previously mentioned. When the counter 162 have counted three pulses, the AND element 185 produces an output, whereupon the INHIBIT element 184 produces an output to set the flip-flop 230 (FIG. 5). The set output of this flip-flop is amplified by an amplifier 232 to energize a relay 234 to close its contact 234a1, whereupon a lamp 236 is turned on to illuminate the indication in the window 20. At the same time, the relay 234 has its other contact 234a2 closed so that a motor 238 for driving the cash dispensing mechanism is started.

The set output of the flip-flop 230 is also applied through a line L15 and the OR element 222 to the flip-flop 208 to reset the same, so that the timer 210 is restored before the time set in the timer has elapsed. This means that the system does not perform the operation it did with invalid cards upon production of an output by the timer, as previously mentioned.

As the counter 162 steps forward, the AND element 187 produces an output. Before this, the AND element 186 produced an output, which was applied to one input of the AND element 202. However, since the flip-flop 192 was reset at that time, the AND element 202 produced no output. In short, the output of the AND element 186 effected no change in the system.

The output of the AND element 187 is applied to one input of each of the AND elements 241 - 245. As previously mentioned, the outputs of the AND elements 141 - 150 are applied through a line L25 to the other inputs of the AND elements 241 - 250, respectively. Therefore, three of the AND elements 241 - 245 corresponding to the three of the AND elements 141 - 145 which produce an output, produce an output. These three outputs are applied to three of OR elements 251 - 255, the outputs of which are applied to a decoder 256. The decoder converts the code expressed by the input signals into a decimal number and produces a signal at a correspnding one of the ten output terminals 257. This signal is applied to a printer 258 to pick a type having a corresponding numeral in the second place of the card number.

As the counter 162 further steps forward, the AND element 188 produces an output, which is applied to the AND elements 246 -250. Therefore, those three of the AND elemets 246 - 250 which receive the outputs of three of the AND elements 146 - 150 produce an output. These three output signals are applied through the OR elements 251 - 255 to the decoder 256, the output of which operates the printer 258 to set a type having a corresponding numeral in the first place of the card number next to the previously picked type.

As the counter 162 further advances, the AND element 189 produces an output, which is applied to the printer 258 as a command signal to strike the picked out types, thereby printing a two-figure number expressing the identification number of the card introduced on a suitable sheet of paper. Upon completion of the printing, the printer is automatically restored to its original condition.

As the counter 162 steps still forward, finally the AND element 190 produces an output, which is applied through the line L16 to the OR elements 204 and 212 (FIG. 4). The output of the element 204 resets the flip-flop 156, while the output of the element 212 sets the flip-flop 214. The set output of the flip-flop 214 energizes the relay 218, which causes the finished card to drop through the hopper 68 into the receptacle 73, and at the same time the resetting of the flip-flop 156 removes the outputs of the AND elements 141 - 150, as in the case with invalid cards. The reset output of the flip-flop 156 also resets the counters 164 and 166 and upon temporary closing of the contact 74a of the switch 74 acted on by the dropping card, the flip-flop 214 (FIG. 4) is reset, as in the case with invalid cards.

Should the proximity detector 56 or 58, or the photoconductive element 125 or 126 get out of order, or the lamp 62 have its filament broken, the card that hit on the second stopper 54 would not advance any further. To avoid this, the following measure is taken in the system of the invention: As the card passes the switch 55, its contact 55b is temporarily opened and then closed, whereupon the differentiator 206 produces an output to set the flip-flop 208, the set output of which is applied to the timer 210 (FIG. 4). Under the condition, when the time set in the timer has elapsed, the timer applies a signal through the OR element 212 to the flip-flop 214 to set the same. The set output of this flip-flop 214 energizes the relay 218. As previously mentioned, upon energization of the relay 218, the card is drawn into the receptacle and the system is restored to its original condition. The output of the timer 210 also triggers a mono-multivibrator 260 (FIG. 5) through a line L17. The output of the element 260, which lasts a predetermined period of time, is applied through the OR element 194 to the amplifier 196, the output of which energizes the relay 198. This turns on the lamp 200 for illuminating the indication that the card is valid. As the card drops through the hopper 68, the switch 74 is acted on, so that the flip-flops 208 and 214 are reset, whereby the system is restored to its original condition.

It will be seen that when the timer 210 produces an output, it means not only that the lamp 62 is in disorder, but also that an invalid card has been introduced. Therefore, if the timer 210 successively produces an output, it possibly suggests that an intended profiteering or mischief is being done. To meet such undesirable situation, the output of the timer 210 is also applied through a line L18 to a tertiary pulse counter 262 (FIG. 5). When three inputs have been applied in succession, the counter 262 produces an output to be applied through a line L21, the OR element 108 and the amplifier 118 to the relay 112, whereupon the relay contact 112a is closed to apply an inhibit signal to the INHIBIT element 82 (FIG. 4), thereby preventing introduction of any more cards. At the same time, the other contact 112b (FIG. 6) of the relay, normally closed, is opened to deenergize a solenoid 264, thereby changing the indication in the window 16 from "IN OPERATION" to "NOT OPERATING". Unless the timer 210 produces an output more than three times in succession, the set output of the flip-flop 230 resets the counter 262 through an OR element 266.

When the card introduced is valid, the flip-flop 230 is set, as previously mentioned. The set output of the flip-flop is applied through a line L22 to a differentiator 268 (FIG. 6), the output pulse of which sets a flip-flop 270. The set output of the flip-flop 270 is applied to one input of an AND element 272, to the other input of which is applied the output pulse of the differentitor 220 (FIG. 4) through a line L19. Since the output pulse of the differentiator 220 is produced while a card is passing through the hopper neck into the receptacle 73, the AND element 272 produces an output when a valid card has been received into a receptacle 73. The output of this AND element 272 sets a flip-flop 274, the set output of which energizes a relay 278 through an amplifier 276. The relay 278 controls the commencement of operation of dispensing cash out of the outlet 14 (FIG. 1).

Upon energization of the relay 278, its contact 278a is closed to energize a solenoid 280. This turns a lever 286 (FIG. 7) counterclockwise about a pivot pin 282 against the force of a spring 284 biasing the lever clockwise. A lever 288 is pivoted by a pin 290 to the lever 286 and biased clockwise by a spring 292. Upon counterclockwise pivoting of the lever 286, the pin 290 is turned counterclockwise about the pin 282, so that the lever 288 rotates a rachet wheel 294 and, consequently, the shaft 296 to which the rachet wheel is keyed for a predetermined angle. This causes a cam plate 298 on the shaft to be simultaneously rotated, thereby rotating a lever 304 about a pivot pin 300 against the force of a spring 302 biasing the lever 304 counterclockwise. The rotational angle of the shaft 296 is such that the forward end of the lever 340 comes to ride on a rise 298' formed on the periphery of the cam 298. Upon clockwise rotation, the lever 304 presses a pair of switches 306 and 308 to close their contacts 306a and 308a (FIG. 6). Upon closing of the switch contact 306a, an electromagnetic clutch 310 is operated to effect a drive connection between a motor 238, already rotating, and a shaft 312, which latter is then rotated in the direction of an arrow X. On the other hand, the closing of the other switch 308 causes a solenoid 314 to be energized so that a claw 318 is pivoted clockwise about a pin 316 against the force of a spring 320 so as to disengage from a lock plate 322, thereby letting the shaft 312 free to be rotated by the motor 238.

Upon rotation of the shaft 312, a cam 324 rigidly mounted thereon and having a dent 324' on its periphery is rotated to actuate a switch 326 to close its contact 326a (FIG. 6), after which when the contact 306a is opened, the clutch 310 is kept operating. It may be mentioned that the opening of the contact 306a is effected in the following manner: Upon rotation of the shaft 312, a cam plate 328 is rotated so that a lever 334 biased counterclockwise by a spring 332 is pivoted clockwise about a pin 330. A claw 340 is pivoted to the lever 334 by a pin 336 and biased clockwise by a spring 338. When the shaft 296 was previously rotated, the claw 340 came to engage a tooth of a rachet wheel 342. Then, the clockwise pivotal movement of the lever 334 causes the pin 336 to rotate clockwise about the pin 330, so that the claw 340 further rotates the rachet wheel 342. This causes the claw 304 on the rise 298' of the cam 298 to ride over it and consequently to be rotated by the biasing spring 302 counterclockwise about the pin 300, thereby restoring the switches 306 and 308. After restoration of the switch 308, the lock plate 322 will not engage with the claw 318 before finishing one complete revolution.

Figure 8:
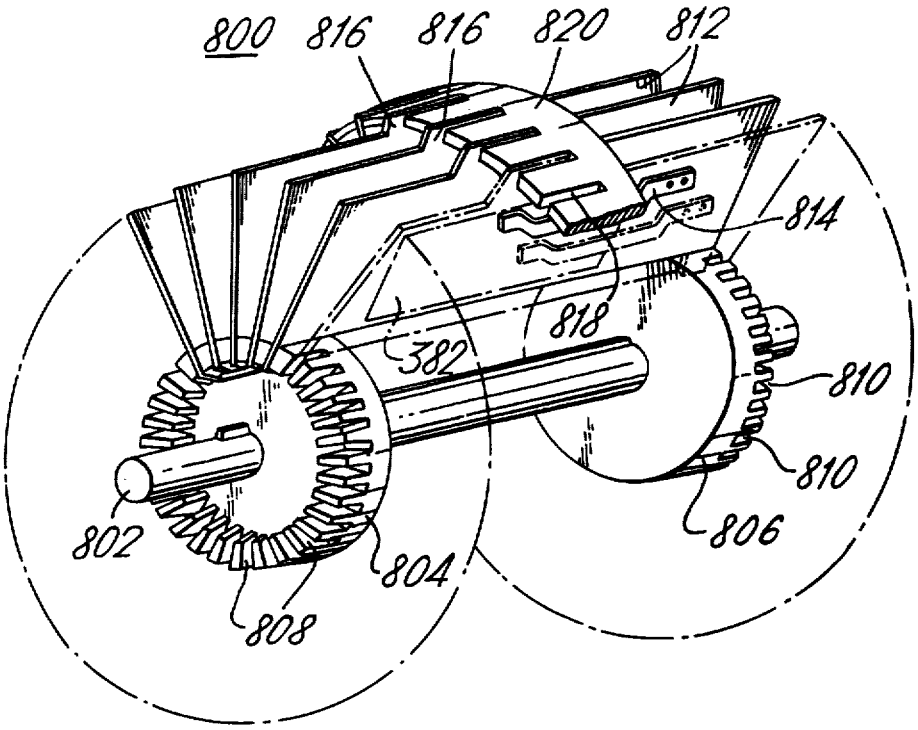
FIG. 8 is a fragmentary perspective view, on an enlarged scale, of the cash storage drum shown in FIG. 7.

The cash to be dispensed out of the machine is enclosed in an envelope. Many cash containing envelopes are stored in a rotary storage drum 800 as shown in detail in FIG. 8. The drum comprises a pair of bosses 804 and 806 rigidly mounted on a rotatable shaft 802 for rotation therewith and axially spaced a predetermined distance apart from each other. A plurality of grooves 808 and 810 are circumferentially formed at one end face of each of the members 804 and 806. A plurality of partition plates 812 are inserted into the grooves 808 and 810 so as to extend radially outwardly, thereby dividing the space around the shaft 802 into a plurality of radial compartments, in which a cash containing envelope is retained by means of a clip 814 secured to one surface of each partition plate 812. Each partition plate is also formed on its outer radial edge with a tongue 816. A space retainer ring 820 is formed with a plurality of slots 818 circumferentially and equidistantly spaced apart. The ring 820 encircles the partition plates 812 so that the tongue 816 of each plate engages in one of the slots 818, thereby keeping the space or compartment between each adjacent pair of the partition plates. A cylindrical hood 822 (FIG. 7) covers the partition plates. A plurality of windows 824 are formed in the hood 822 circumferentially equidistantly spaced from each other, each between each adjacent pair of the partition plates. A switch 346 has an actuator 344 adapted to be fitted into the windows 824. A series of holes 826 are formed in the hood circumferentially thereof, one adjacent each window 824. A lock pin 350 is biased by a spring 348 upwardly to have its forward end fitted into the hole 826, thereby locking the drum 800 against rotation and holding it at a proper position where a cash envelope is sent out by a dispensing mechanism to be described later.

A pin 352 is planted on the pin 350 so as to engage in a slot 358 formed in one arm of a lever 356 pivoted on a pin 352. The other arm of the lever 356 is in contact with a cam 359 mounted rigidly on the shaft 312, so that upon rotation of the shaft, the lever 356 is first pivoted counterclockwise. As the lever 356 is thus pivoted, it leaves a switch 360 to open its contacts 360b (FIG. 6), and upon further rotation of the cam 359, the lever 356 is pivoted clockwise to its original position to close the contact 360b. During this course of events, the lock pin 350 is first pulled downward out of engagement with the hole 826. Upon release of the lock, the storage drum 800 is rotated by any suitable mechanism not shown for the angle corresponding to the angular distance between the adjacent two of the holes 826. Then, the lock pin 350 is restored to be fitted into the hole 826 next to that from which it has just been pulled out.

A cam 362 is rigidly mounted on the shaft 312 for rotation therewith. Upon one half revolution of the cam 326, a switch 364 is actuated to have its contact 364b opened and upon a little more rotation of the cam 362, the contact 364b is closed. If the pin 350, once disengaged from a hole 826, has not been fitted into the next hole, the switch contact 360b remains opened and further rotation of the shaft 312 is stopped by the opening of the switch contact 364b to deenergize the clutch 310, thereby preventing further operation of the mechanism.

The cash envelope dispensing mechanism is generally designated at 366 in FIG. 7 and comprises a lever 370 pivotable about a pin 368 and a lever 374 pivoted by a pin 372 to one end of the lever 370. The lever 370 is normally biased clockwise by a spring 376. However, upon rotation of a cam 378 mounted on the shaft 312, the opposite end of the lever 376 engages in a dent 378' formed on the periphery of the cam 378, whereupon the lever 370 is pivoted clockwise, thereby pushing the lever 374 rightward into a compartment of the drum 800, so as to push an envelope stored in that compartment out of the right-hand side of the drum. When the lever 370 is pivoted clockwise, it acts on a switch 384 to close its contact 384a, thereby energizing a solenoid 386 (FIG. 6). A lever 392 is pivotable about a pin 388 and biased clockwise by a spring 390. The solenoid 386, when energized, pulls one end of the lever 392 so that a roller 394 on the opposite end thereof is moved toward a drive roller 396 as far as the two rollers sandwich the envelope 382 that has been sent out of the drum. The roller 396 is rotated simultaneously with the energization of the solenoid 386, so that the cash envelope is further drawn out righward as far as its one end appears out of the slot 14 (FIG. 1) ready to be manually pulled out by the debtor.

A switch 398 is so disposed as to be actuated by the envelope being drawn out of the drum. By the operation of the switch it is possible to know that an envelope has been received by the debtor.

It will be seen that the dispensing operation of one envelope is completed by one revolution of the shaft 312. Since the switch 326 is opened again upon one revolution of the shaft 312 thereby to deenergize the clutch 310, with one card introduced only one cash envelope is dispensed, and no more.

The switch 398 actuated by the envelope is restored when the envelope is pulled out, so that its contact 398b (FIG. 6), once opened, is again closed, whereupon a differentiator 400 produces an output pulse to be applied through an OR element 402 to the flip-flops 270 and 274 to reset the same. The reset output of the flip-flop 274 is applied to a differentiator 404, the output of which resets the flip-flop 230 (FIG. 5) via a line L23, so that the relay 234 is deenergized to turn out the lamp 236 and stop the motor 238 at the same time. The output of the differentiator 404 is also applied through the line L23, a line L20 and the OR element 228 to the flip-flop 102 to reset the same, thereby restoring the system to its original condition.

After resetting of the flip-flop 230, the cash envelope dispensing mechanism may stop in its course of operation for some cause or other, so that the original condition of the system cannot be restored. To avoid this, the following measure is taken in the system: The set output of the flip-flop 230 is applied through the line L22 to a timer 406 (FIG. 6). The time period set in the timer is a little longer than the time required for one cycle of cash dispensing operation. Therefore, when the set time period has elapsed, the timer 406 produces an output, which is amplified by an amplifier 408 and then applied to a relay 410 to open its contact 410b, thereby turning out the lamp 236. The output of the timer 406 is also applied through the OR element 108 and the amplifier 110 to the relay 112 to open its contacts 112b, thereby opening the energizing circuit for the cash envelope dispensing mechanism. Upon opening of the contact 112b the solenoid 264 is deenergized, so that the indication "NOT OPERATING" appears in the window 16. On the other hand, the other contact 112a of the relay 112 is closed to apply an inhibit signal to the INHIBIT element 82, thereby preventing introduction of any more cards.

The switch 346 provided adjacent the surface of the cash storage drum 800 (FIG. 7) is for the purpose of detecting the absence, by mistake or for some other reason, of an envelope in any of the storage compartments, or that all the envelopes have been dispensed. This switch 346 is positioned relative to the push lever 374 so that the former faces the window of that storage compartment into which the lever 374 is to be pushed in the next dispensing operation. So long as an envelope is in that compartment, the actuator 344 of the switch 346 is held by the envelope so as not to get into the window 824. If there is no envelope in the compartment, the actuator 344 gets in the window so that the switch contact 346a is closed to apply an input to the INHIBIT element 412 (FIG. 6). Suppose that under the condition that the switch actuator 344 is in the window of a compartment (containing no envelope), the push lever 374 faces the compartment (containing an envelope) immediately before the empty compartment. In this case, the operation of the dispensing mechanism must not be instantly stopped until the envelope in the compartment immediately before is dispensed out. When this envelope has been sent out, the switch 398 is operated so that the flip-flop 230 is reset, as previously mentioned. This removes from the line L22 the set output of the flip-flop 230 that has been applied as an inhibit signal to the INHIBIT element 412, whereupon an output is produced by the element 412 to energize the relay 112, so that the indication "NOT OPERATING" now appears in the window after the envelope has been sent out.

A push button reset switch 414 is provided for manually restoring the system to its original condition. When the switch is closed, a solenoid 416 is energized to restore the relay 112 on the one hand, and an input is applied through the OR element 402 and the line L24 to reset the flip-flops and the counters.

What we claim is:

1. An automatic credit loan machine operable in response to credit cards introduced thereinto, each said card having its own identification number and at least one element by which to recognize its genuineness, comprising in combination: detection means for detecting said element on a credit card introduced into said machine to test its genuineness; card reading means coupled with said detection means and operable in response to said detection means for reading said identification number of said card; validity testing means for testing the validity of said identification number that has been read; recording means; means for controlling said recording means to record said identification number only when said number is valid; card storage means for storing genuine cards introduced into said machine; card conveyor means for moving cards from said detection means to said reading means and then to said storage means; cash storage means for storing cash; and control means coupled with said cash storage means and with said validity testing means for dispensing a loan of cash when said identification number is valid.

2. The machine of claim 1, further including means for preventing introduction into said machine of another credit card until the previously introduced credit card has been processed and transported to said storage means.

3. The machine of claim 1, further including means for stopping said conveying means when said card has not passed a predetermined point between said detecting means and said reading means within a predetermined period of time after said conveying means started to convey said credit card from said detecting means toward said reading means.

4. The machine of claim 1, further including means for setting a predetermined period of time required for said reading means to finish reading said identification number of a credit card; and means for preventing the operation of said dispensing means when passage of said predetermined period of time has been repeated a predetermined number of times.

5. The machine of claim 1, further including system reset means set to a first condition by said cash that is going to be dispensed and to a second condition by said cash leaving said reset means, said reset means being operative upon being set to its second condition to reset the machine to its original condition of readiness to receive a card.

6. The machine of claim 1 wherein said detection means includes first and second sequentially arranged detection stations, and said machine includes means for closing the path of card travel between said first and second stations after a card travels from said first station to said second station.

*7. Access-control equipment for selectively enabling access to a facility comprising: first means for receiving a part at least of a coded token presented to the equipment and for admitting the token further to the equipment only in the event that said part has a predetermined characteristic, said characteristic being a characteristic indicative, at least partly, of authenticity of the token, second means responsive to any token admitted as aforesaid for reading from the admitted token information encoded thereon, third means that is selectively operable to enable access to said facility, and fourth means for operating said third means in dependence upon the information read from said token, said first means providing an entrance to the equipment for the coded token as presented to the equipment and also including a shutter device for blocking entry of the presented token through said entrance, and shutter-control means responsive to said part of the presented token for displacing said shutter device to admit the token through said entrance only in the event that said part of the token has said predetermined characteristic.*

*8. Access-control equipment according to claim 7 wherein said second means is spaced from said entrance, and the equipment includes a token-transport arrangement for transporting along a path to said second means any token admitted to the equipment through said entrance.*

*9. Access-control equipment for use with a coded token having a marginal part that has a predetermined characteristic comprising: means defining an external mouth for receiving the token as presented to the equipment with said marginal part leading, switchable token-entry means for controlling entry of said token to the equipment through said mouth, said token-entry means having a first state in which said token-entry means restricts entry of said token through said mouth to said marginal part alone and a second state in which said token-entry means is operative to admit the whole token to said equipment through said mouth, means responsive to entry through said mouth of said marginal part having said predetermined characteristic to switch said token-entry means from its first operative state to its second operative state, token-reading means for receiving said token only when admitted in whole through said mouth, said token-reading means reading from the received token information encoded thereon, and access-enabling means operable in dependence upon the said encoded information read from the token.*

*10. Access-control system as recited in claim 9, wherein said switchable token-entry means includes a shutter device blocking entry of the token presented through said mouth in said first state of said switchable token-entry means, and wherein said means switching said token-entry means displaces said shutter device from said mouth in said second state of said switchable token-entry means.*

*11. Access-control equipment for selectively enabling access to a facility comprising: first means for receiving a part at least of a coded token presented to the equipment and for admitting the token further to the equipment only in the event that said part has a predetermined characteristic, said characteristic being a characteristic indicative, at least partly, of authenticity of the token, second means responsive to any token admitted as aforesaid for reading from the admitted token information encoded thereon, third means that is selectively operable to enable access to said facility, and fourth means for operating said third means in dependence upon the information read from said token, said first means providing an entrance to the equipment for the coded token as presented to the equipment and also including fifth means for affording a restriction to entry of the presented token through said entrance, and sixth means responsive to said part of the presented token for controlling said fifth means to remove said restriction and to thereby admit the token through said entrance only in the event that said part of the token has said predetermined characteristic.*

*12. Access-control equipment according to claim 11, wherein said second means is spaced from said entrance, and the equipment includes a token-transport arrangement for transporting along a path to said second means any token admitted to the equipment through said entrance.*

* * * * *